(12) United States Patent
Early (10) Patent No.: US 6,445,457 B1
(45) Date of Patent: Sep. 3, 2002

(54) LASER DETECTION OF MATERIAL THICKNESS

(75) Inventor: James W. Early, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/379,889

(22) Filed: Aug. 23, 1999

Related U.S. Application Data (60) Provisional application No. 60/046,984, filed on Apr. 22, 1997.

(51) Int. Cl.[7] .............................................. G01B 11/06
(52) U.S. Cl. ....................................................... 356/630
(58) Field of Search .................................. 356/357, 448, 356/73, 655, 630, 631, 632; 340/905, 582, 583

(56) References Cited

U.S. PATENT DOCUMENTS

| | | | |
|---|---|---|---|
| 3,720,471 A | | 3/1973 | Kasahara et al. |
| 4,453,828 A | | 6/1984 | Hershel et al. |
| 4,695,162 A | | 9/1987 | Itonaga et al. |
| 4,710,030 A | * | 12/1987 | Tauc et al. ................... 356/432 |
| 4,848,913 A | | 7/1989 | Greiner |
| 5,054,927 A | | 10/1991 | Graves |
| 5,166,751 A | | 11/1992 | Massig |
| 5,536,936 A | | 7/1996 | Drevillon et al. |
| 5,548,403 A | | 8/1996 | Sommargren |
| 5,633,711 A | | 5/1997 | Nelson et al. |
| 5,751,416 A | | 5/1998 | Singh et al. |
| 6,041,020 A | * | 3/2000 | Caron et al. ................. 367/149 |
| 6,108,087 A | * | 8/2000 | Nikoonahad et al. ....... 356/359 |

OTHER PUBLICATIONS

Kaplan, Herbert, "Photonics at Work", *Photonics Spectra*, vol. 30, No. 10, pp. 54–55, discloses a true heterodyne detection of photoacoustic waves used for industrial nondestructive testing for detection of flaws, disbonds, cracks and failure mechanisms in materials, parts and assemblies.

\* cited by examiner

*Primary Examiner*—Frank G. Font
*Assistant Examiner*—Tu T Nguyen
(74) *Attorney, Agent, or Firm*—Gemma Morrison Bennett (57) ABSTRACT

There is provided a method for measuring material thickness comprising: (a) contacting a surface of a material to be measured with a high intensity short duration laser pulse at a light wavelength which heats the area of contact with the material, thereby creating an acoustical pulse within the material: (b) timing the intervals between deflections in the contacted surface caused by the reverberation of acoustical pulses between the contacted surface and the opposite surface of the material: and (c) determining the thickness of the material by calculating the proportion of the thickness of the material to the measured time intervals between deflections of the contacted surface.

8 Claims, 5 Drawing Sheets

LASER DETECTION OF MATERIAL THICKNESS

This application claims the benefit of U.S. Provisional Application No. 60/046,984, filed Apr. 22, 1997 and Non-provisional Application No. 09/964,888 filed Apr. 21, 1998.

This invention was made with government support under Contract No. W-7405-ENG-36 awarded by the U.S. Department of Energy. The government has certain rights in the invention.

TECHNICAL FIELD

This invention relates to use of laser technology to measure thickness of materials, particularly glass, and more particularly molten glass.

BACKGROUND ART

In the glass industry there is a need for measurement of the thickness of glass plate during various stages of manufacture.

Several U.S. Patents disclose thickness measurement methods such as:

(a) measurement of transparent glass or plastic plates by differentiating between the convergence and divergence of an interference fringe pattern created by directing a non-parallel pencil or wedge of rays onto the plate;

(b) use of an interferometer sensor for measuring distance changes of a small surface by splitting a light beam into a measurement beam and a reference beam having two different polarizations, directing the measurement beam through a retarder mounted between the two surfaces and detecting the differences in the optical paths of the measuring and reference beams;

(c) use of an adjustable interferometer to give unity fringe visibility to introduce a controlled prescribed relative phase shift between a reference wavefront and a wavefront from the optics being tested, which permit analysis of the interference fringe pattern using standard phase extraction algorithms;

(d) use of an apparatus (which includes a means for directing a light beam onto thin optical membranes, means for varying the angle of incidence of the light beam upon the membrane, and a means for detecting the angles of incidence of the light beam on the membrane) for measuring the optical thickness or index of refraction of thin optical membranes;

(e) projecting a light beam through an insulating multiple glass sheet insulating unit to determine the thickness of the insulated glass by measuring the size of a beam spot on a target; and (f) use of a thickness measuring gauge for insulating glass which includes a sighting member with a front sight, a rear sight and a sight tube through which the user takes an angled sighting of the insulating glass with the device in contact with the near side surface of the glass. A separate reflective member is situated on the far side of the insulating glass to reflect into view the image of a movable, adjustable target member which reflects the light.

Optical methods are dependent upon the optical transparency of the material to be tested and would be sensitive to many of the harsh conditions present within the high temperature environment of the glass manufacturing process. Optical interference methods are adversely impacted by the bright, black body light emission produced by molten glass.

Ultrasound methods would be sensitive to thermally induced turbulence within the measurement region and process-produced vibrations within the material. Normally ultrasound methods require direct contact of the sound generating and detecting instrumentation with the material surface in order to overcome sound transmission limitations due to the large differences between impedance of air and impedance of the materials being measured by ultrasound.

Thus there is still a need for ways of measuring the thickness of materials such as glass in molten states during manufacture with a truly remote sensing system in which there is no necessity for placing measurement components in contact with or in the immediate proximity of the material being tested for thickness.

Therefore, it is an object of this invention to provide a method and apparatus for measuring the thickness of materials using laser technology.

It is another object of this invention to provide a method and apparatus for measuring the thickness of materials such as glass in molten states.

It is a further object of this invention to provide a method and apparatus for measuring the thickness of materials without a necessity of placing measurement components in contact with or in the immediate proximity of the materials being tested.

It is yet another object of this invention to provide a method and apparatus for measuring the thickness of opaque, partially opaque or reflective materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method of measuring material thickness comprising:

(a) contacting a surface of a material to be measured with a high intensity, short duration laser pulse at a light wavelength which heats the area of contact with the material, thereby creating a compressive acoustical pulse within the material;

(b) timing the intervals between deflections in the contacted surface caused by reverberation of the acoustical pulse between the contacted surface and the opposite surface of the material; and (c) calculating the thickness of the material by multiplying the speed of sound within the material to be measured by one half the length of the time intervals between deflections of the contacted surface.

The material thickness is proportional to the time intervals between deflections in the contacted surface because the length of time it takes for a compressive acoustic wave to travel from the contacted surface to the opposite surface and back again to the contacted surface is proportional to the thickness of the material.

The time interval or delay between deflections in the contacted surface can be measured by detection of changes in angle of reflection of a continuous beam of light reflected from the contacted surface of the material to be measured.

Alternatively, after contacting the surface of the material with laser energy to produce a compressive acoustic wave through the material, deflections of the opposite surface of the material can be detected and monitored using such means as a pressure transducer and an oscilloscope. The thickness of the material can be calculated using the time it takes for the acoustical pulse to travel through the material and the speed at which an acoustical pulse travels in the particular type of material being measured.

An apparatus for carrying out the method of the invention has a means for contacting the surface of a material to be measured with a short duration laser pulse at a wavelength which heats the area of contact with the material, thereby creating an acoustical pulse within the material; and a means for monitoring either the reverberation of acoustical pulses between the two surfaces of the material or for monitoring travel of acoustical pulses from one surface of the material to the opposite surface.

BRIEF DESCRIPTION OF THE DRAWINGS

The accompanying drawings, which are incorporated in and form a part of the specification, illustrate preferred embodiments of the present invention and, together with the description, serve to explain the method and principles of the invention.

BEST MODES FOR CARRYING OUT THE INVENTION

It has been discovered that the thickness of materials such as glass, particularly glass in a during molten state during manufacture, can be determined by measurement of time required for a compressive acoustic wave to travel through the material. Lasers are used to generate the acoustical pulse within the material to be measured and to monitor deflections of the material surface caused by reverberation of the acoustical pulse between the two surfaces of the material.

The invention apparatus has two basic elements: (a) a means for generating a temporally short acoustical pulse within the material being measured; and (b) a means for monitoring reverberation of acoustical pulses between two surfaces of the material. The thickness of the material being measured can be derived from the relationship of the thickness of the material to the time required for the acoustical pulse to travel through the material, given the speed of the sound in that particular material.

It is the total transit time of the compressive acoustical pulse through the material which is being measured; i.e., the time from the origin of the compressive acoustical pulse at the contacted surface, through its propagation to the opposite surface and back to the contacted surface after reflection of the acoustic wave from the opposite surface of the material. With knowledge of the speed of sound within the particular material being measured, the thickness of the material is found simply by measurement of the round trip time of the acoustical pulse, thusly:

$$d=(v_s)(\delta t/2) \quad (1)$$

wherein d=thickness of the material being tested $v_s$=speed of sound within material being tested $\delta t$=time for acoustic pulse to travel from the contacted surface to the opposite surface and back to the contacted surface In the alternative embodiment of the invention in which the deflection of the opposite surface rather than the contacted surface is being monitored, the same type of calculation can be made to determine thickness of the material. The thickness of the material is calculated from the time that it takes the acoustical pulses to travel from the opposite surface to the contacted surface and back again, factoring in the time per given distance required for the acoustical pulse to travel in the particular type of material being measured. The first transit of the acoustic wave or pulse from the contacted surface to the opposite surface is not measured because the interval between the reverberations of the acoustic wave or pulse is what will enable monitoring from the opposite side to give travel time needed to calculate thickness.

The thickness of the glass can be calculated using the formula:

$$d=(v_s)(\delta t/2) \quad (2)$$

wherein d=thickness of the material being tested $v_s$=speed of sound within material being tested $\delta t$=time for acoustic pulse to travel from the opposite surface to the contacted surface and back to the opposite surface The means for generating a temporally short acoustical pulse within the material to be measured can be any laser which produces light at a wavelength which is readily absorbed within the material being measured. A solid state laser or gas laser can be used. A Er:YAG laser or Nd:YAG laser is presently preferred because light emissions from these lasers are readily absorbed in glass and because the utility of these lasers is enhanced by the fact that they are solid-state lasers. Alternatively, the short duration pulse may be obtained directly from a TEA $CO_2$ laser, a gain Q-switched or mode-locked $CO_2$ laser or by pulse slicing from a longer duration $CO_2$ laser pulse. Other solid state and gaseous lasers can be used and may be more suitable for measuring thickness of materials other than glass.

A temporally short pulse is needed because the compressive acoustical pulse induced within the material being measured must be significantly shorter in temporal duration than the transit time of the compressive acoustic wave in the material being measured in order to obtain optimal accuracy of the thickness measurements.

Ranges of useful parameters for operation of the pulse generating or excitation laser beam are shown in Table 1.

TABLE 1

Excitation Laser Operation Parameters

|  | Broad Range | Intermediate Range | Narrow Range |
|---|---|---|---|
| Power | 1 W–100 Mw | 1 Kw–1 Mw | 1 Kw–100 Kw |
| Pulse width | 10 femtosec–200 ns | 0.1 ns–100 ns | 1 ns–20 ns |
| Wavelength | 200 nm–12 $\mu$ | 1 $\mu$–12 $\mu$ |  |

The reverberation of the acoustical pulses between the two surfaces of the material can be timed by measurement of angular displacement of reflected continuous laser light applied to the surface of the material. The means for providing the continuous laser light for monitoring the timing of the reverberation of acoustical pulses between the two surfaces of the material can include any laser which provides continuous laser radiation over a period of time which is longer than the period of time required for transit of several acoustic echos within the material being measured. Either a continuous wave beam or a pulsed beam having long pulse widths of 20 microseconds or longer can be utilized in the invention.

Solid state or gaseous lasers may be used for the continuous wave laser beam source, depending upon what material is being measured. For example, HeNe lasers are presently preferred when molten glass is being measured.

Ranges of useful parameters for operation of the continuous wave monitoring laser beam are shown in Table 2.

TABLE 2

Continuous Wave Laser Operation Parameters

|  | Broad Range | Intermediate Range | Narrow Range |
|---|---|---|---|
| Power | 1 $\mu$W–10 W | 0.1 mW–1 W | 1 mW–10 mW |
| Pulse width | continuous | 20 $\mu$s–10 s | 20 $\mu$s–200 $\mu$s |
| Wavelength | 200 nm–12 $\mu$ | 200 nm–1 $\mu$ | 350 nm–700 nm |

The monitoring means also includes an optical remote sensing means such as a photodetector, photomultiplier or photodiode for detecting changes in the angle at which the beam from the monitoring system laser is reflected from the surface of the material being tested.

Figure 1:
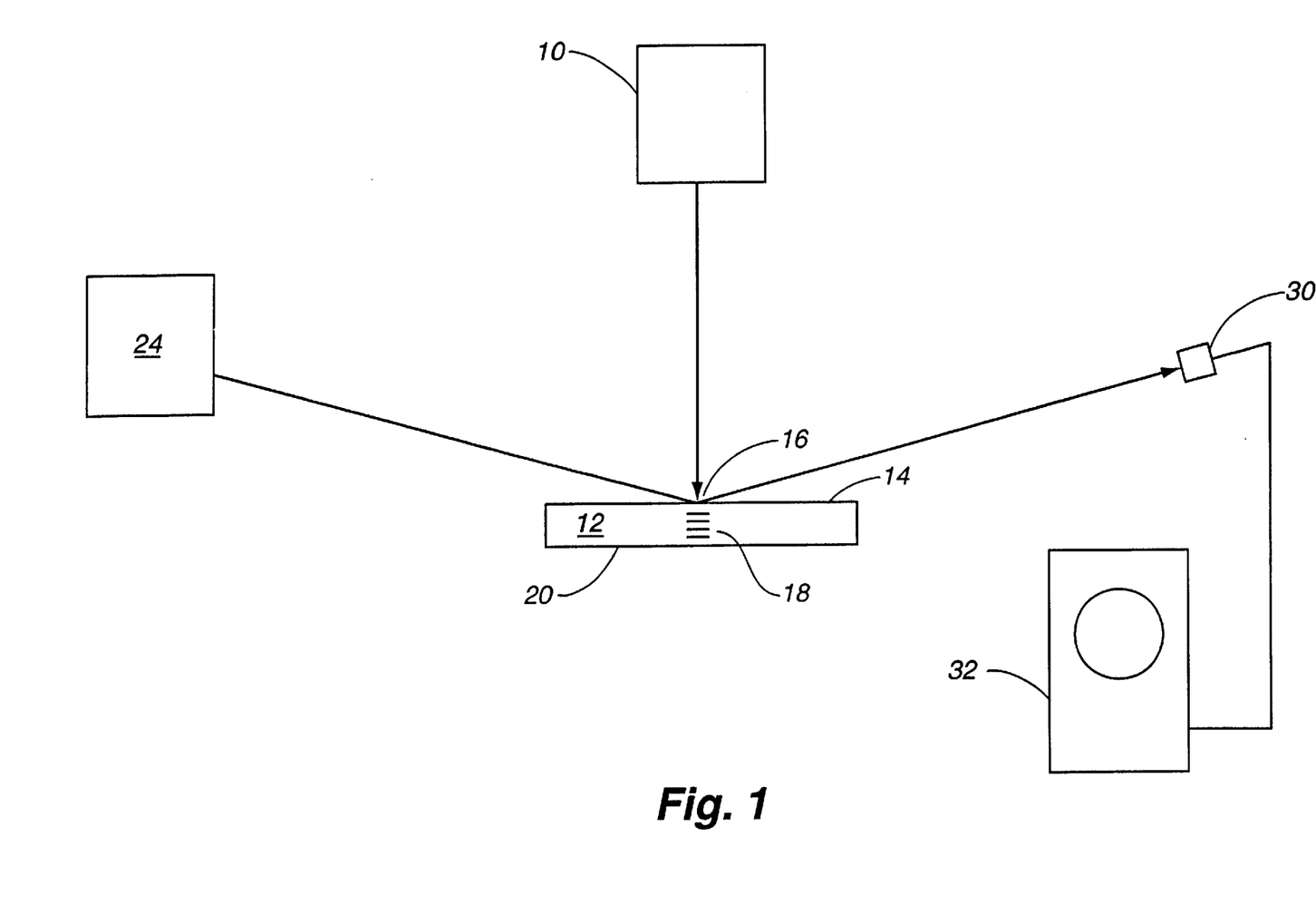
FIG. 1 is a schematic of a presently preferred embodiment of the invention apparatus.

A presently preferred embodiment of the invention useful for measurement of molten glass plates during a tin float manufacturing process is depicted in the schematic representation of FIG. 1.

A short duration laser light pulse produced by a first laser 10 operating at a wavelength which is strongly absorbed within a solid or molten glass plate 12 is directed upon the glass surface 14 at a given detection location 16. Generally wavelengths in the range from about 200 nanometers to about 12 microns are presently preferred, depending upon the light absorptive properties of the material to be measured. The light absorptive properties of the material can be either linear or non-linear in nature. For instance, material normally not absorptive at low laser light intensities can become highly absorptive at higher light intensities. The non-linear absorption of high intensity laser light permits application of the thickness measurement methods of this invention to a wide range of solid materials, including metals and non-metallic materials such as ceramics. The thickness measurement methods of this invention can also be employed to measure thickness of most any liquid films or layers which can efficiently absorb the pulsed laser light.

A very broad range of laser power intensities can be used, depending upon the particular type of material being radiated. Power sufficient to heat the contact area enough to generate the acoustic pulse is required. However, it is prudent to use a laser intensity which is not so strong as to damage the material being measured. Generally laser light with a peak power in the range from about 1 kW to about 100 megawatts can be used in practice of the invention.

When molten glass is the material to be measured, it is presently preferred that the first laser be a Q-switched, 1.06 micron, Nd:YAG solid-state laser or a gaseous laser such as a 10.6 micron, $CO_2$ laser, either of which would be strongly absorbed within crown or flint glass. Laser pulses from the first laser in the range from about 1 picosecond to about 200 nanoseconds are generally useful in the present invention. Laser pulses of less than 20 nanoseconds are presently preferred when the material being measured is a solid, such as glass, which transmits sound at high speeds.

The rapid thermal deposition of laser light energy by the short duration laser pulses produces an intense, short wavelength, thermally-induced acoustical pulse wave 18 in the material being measured. The acoustic wave, containing compressive and rarefactive parts, has a period approximately equal to twice that of the short duration excitation laser light pulse temporal length.

The short absorption length of the laser light within the glass localizes the laser energy deposition and formation of the acoustic pulse or wave to a shallow region just below the glass surface 14 at the given location 16. This compressive acoustic wave 18 propagates through the glass layer 12 to the opposite surface 20 where it is reflected by the material discontinuity.

The reflected acoustic wave 18 then returns to the contacted surface 14 at time $\delta t$. The glass surfaces 14 respond in a manner very much like the displacement of a microphone diaphragm in response to the arrival of sound pressure waves. The reflection of the wave 18 from the opposite surface 20 induces a rapid vertical deflection of the contacted glass surface 14.

The glass layer thickness is directly proportional to the round trip time $\delta t$ it takes the compressive acoustic wave 18 to travel through the glass 12.

A laser-based, remote sensing method is used to monitor the temporal delay between successive pressure pulse echoes arriving at the contacted surface 14 of the glass 12. In this embodiment of the invention, still with reference to FIG. 1, continuous laser light from a He—Ne laser 24 is obliquely directed upon the glass surface 14 at or near the detection area 16 of glass illuminated by the short pulse duration laser light 10. He—Ne lasers having about 1 or more mW power are presently preferred. The He—Ne laser 24 is positioned so that the beam from it strikes the surface of the material 14 to be measured at near grazing incidence. The vertical surface motion induced by the acoustical pressure pulse causes an angular displacement of the He—Ne light reflected from the surface 14. The reflected He—Ne light is subsequently detected by a stationary, small aperture photodetector 30 placed within the reflected light.

The aperture of the photodetector 30 is initially centered within the reflected He—Ne light beam. The angular deflection of the reflected He—Ne light beam by the arrival of the acoustical pulse at the glass surface 14 causes an angular deflection of the reflected He—Ne light which moves the He—Ne beam slightly off the detector aperture causing a reduction in the detected light level signal. This can be seen by using oscilloscope 32 to monitor the output of the photodetector 28. This modulation of the detected He—Ne signal occurs with each transit of the acoustical pulse within the glass.

Figure 2:
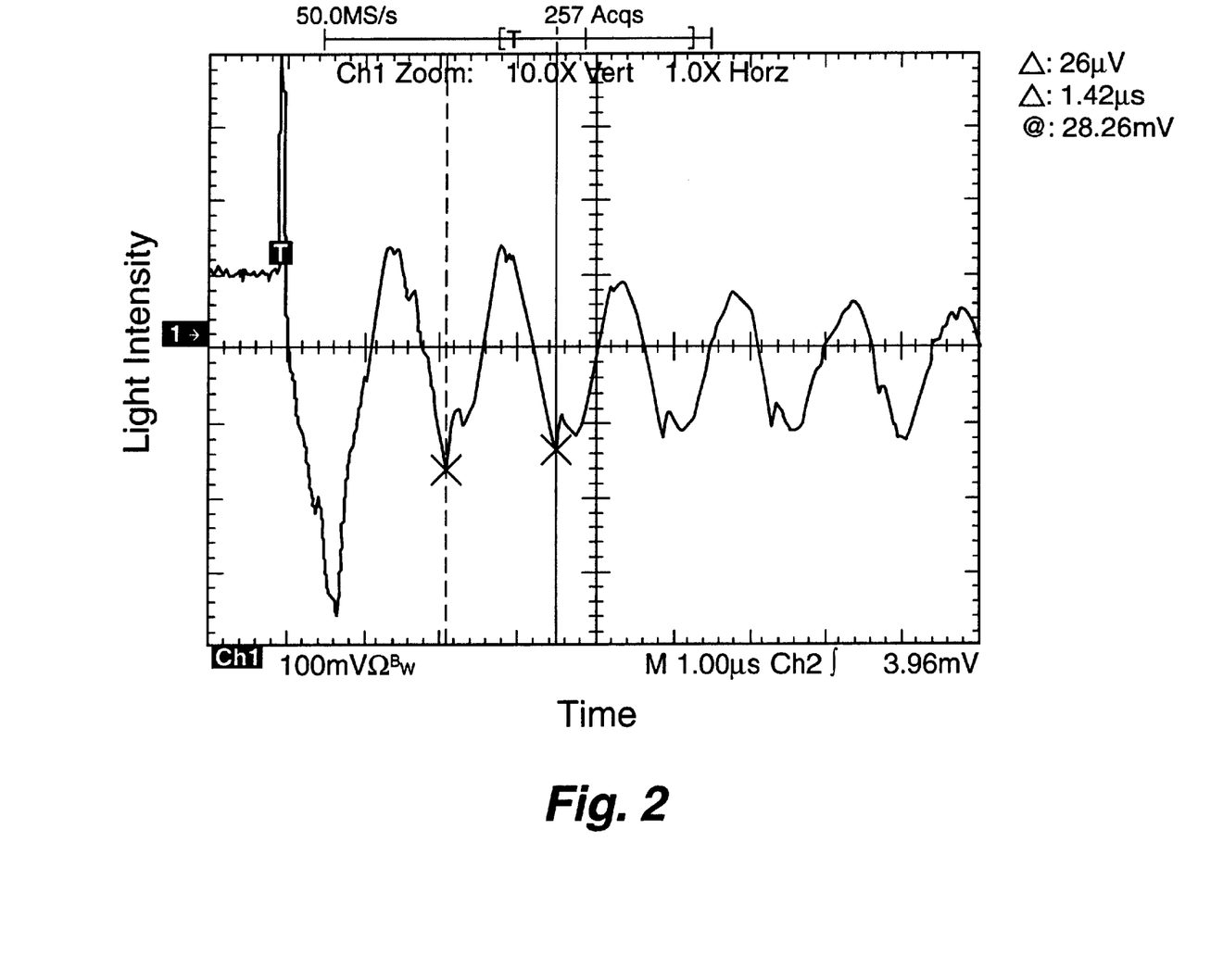
FIG. 2 is a graph of measurement of multiple acoustic wave echoes using the method of the invention shown in FIG. 1.
Figure 3:
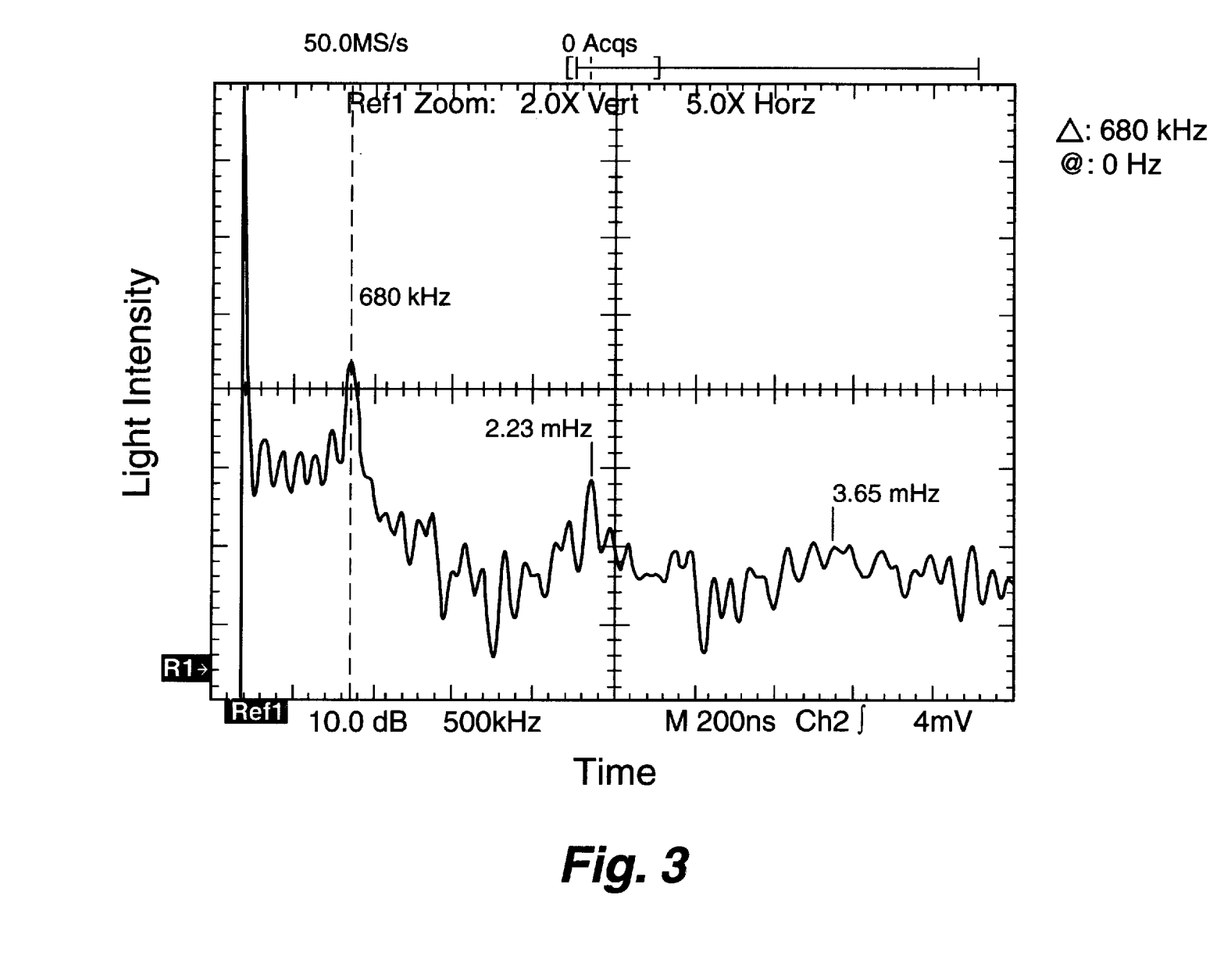
FIG. 3 is a graph of the frequency of laser induced acoustic waves returning to the surface of a glass plate using a fast Fourier Transform of the temporal signal of FIG. 2.

The resulting signal obtained at the output of the photodetector 28 is shown in FIG. 2, where the He—Ne laser light intensity is periodically reduced. If a Fourier Transform of the temporal signal of FIG. 2 is performed, a peak in the frequency spectrum appears at a frequency which is the inverse of the temporal separation between acoustic echos (the peak at 680 kHz in FIG. 3).

Figure 4:
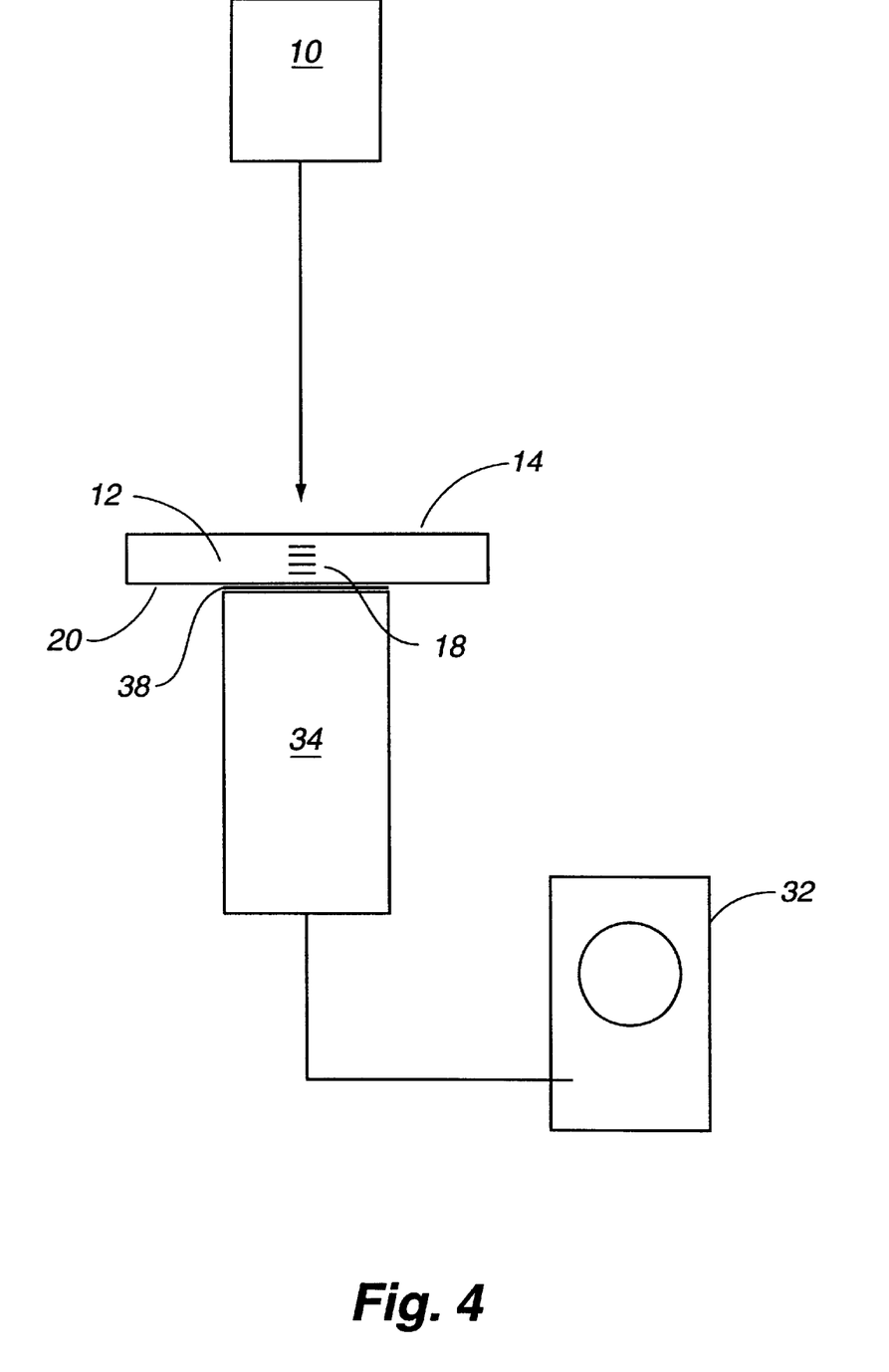
FIG. 4 is a schematic of another preferred embodiment of the invention apparatus using a pressure transducer for detection of deflection of material surface.

In an alternative embodiment of the invention, as shown in the schematic of FIG. 4, a single laser light source 10 can be used to contact the surface 14 of a layer of glass 12, thereby producing an acoustical pulse 18 in the glass 12. As the opposite surface 20 of the glass 12 is deflected by the acoustical pulse 18 in the glass, movement is detected by a pressure transducer 34 and monitored by an oscilloscope 32. The thickness of the material is then calculated from the time that it takes the acoustical pulses to travel from the opposite surface to the contacted surface and back to the opposite surface of the layer of glass, factoring in the time per given distance required for the acoustical pulse to travel in that particular type of glass.

Figure 5:
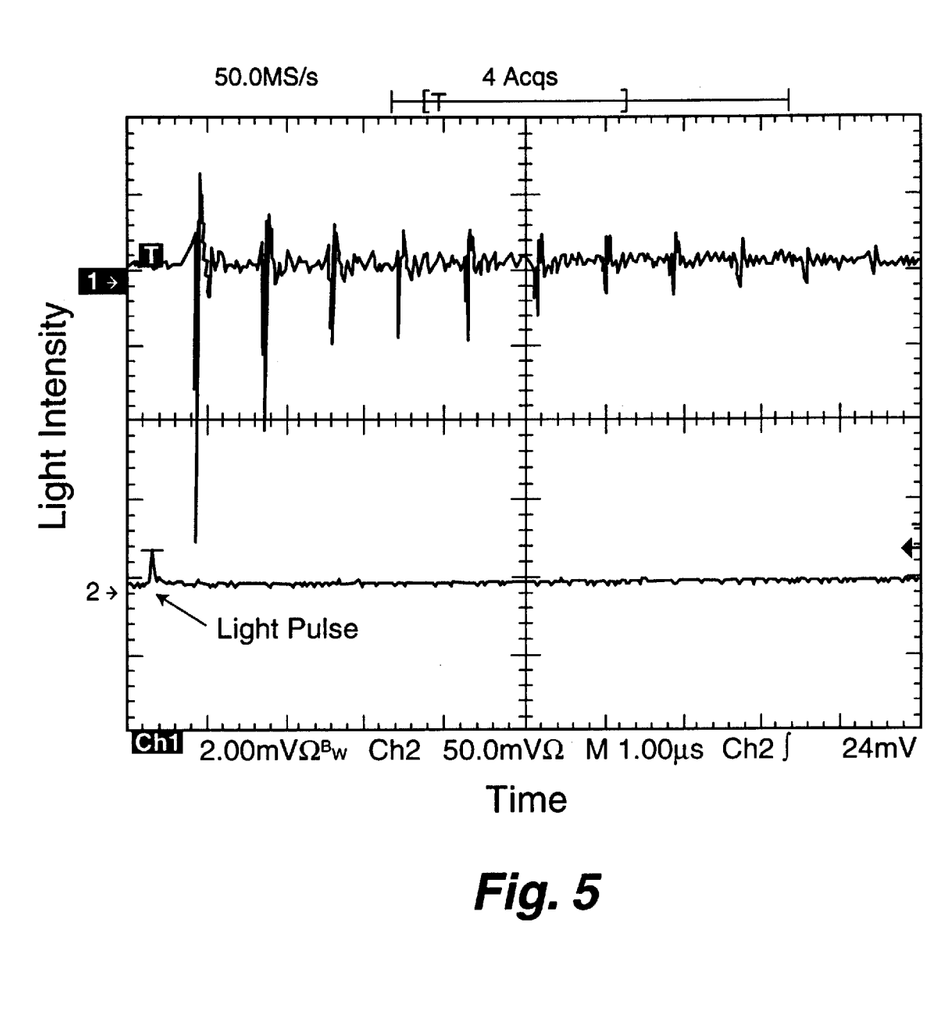
FIG. 5 is a graph of measurement of multiple acoustic wave echoes within a glass plate using a pressure transducer.

In an example of this embodiment of the invention shown in FIG. 4, a 2.44 mm thick glass plate was contacted on an upper surface with a laser light pulse. A pressure transducer was positioned below the glass plate so as to detect deflections of the lower surface of the glass plate. FIG. 5 is a graph of the measurement of the multiple acoustic wave echoes produced within the glass plate.

The embodiment of the invention which uses a pressure transducer to monitor thickness of a material can be used to demonstrate correspondence of light deflection to the arrival of reverberating acoustical pulses at the surface of the material from which the light is deflected. The pressure transducer based method can also be used to determine the speed of sound within the material to be tested by the first stated embodiment of the invention.

The invention method does not depend upon the optical transparency of the material in which the thickness is to be determined. Because an optically generated, material-penetrating acoustic wave is produced and propagated within the material to sense layer thickness, optically dense materials with a wide range of thicknesses can be evaluated.

The invention methods and apparatuses are generally less complex than other available methods for measuring thickness of various materials. A single short pulse excitation laser is used and, in some embodiments, a single continuous wave laser for providing light for reflection off the surface of the material being measured. The invention does not require any beam splitters, combiners, lenses, defraction gratings or third lasers to produce interference patterns, since no interference patterns are used in the invention.

The invention method is insensitive to the bright, black body light emission produced by molten glass or other materials which would overwhelm interferometric based methods of thickness measurement.

The material thickness measurement method and apparatus of this invention is particularly useful for monitoring the thickness of plate glass at various preliminary stages of the glass manufacturing process. The measurement method and apparatus of this invention is insensitive to many of the perturbing influences experienced within the high temperature environment of glass manufacturing processes, overcomes many of the material property associated limitations and provides for truly remote sensing of the material thickness measurement.

For example, when used in glass manufacturing environments, the invention method is insensitive to thermally induced turbulence within the measurement region (an oven at 1,000° C.) and process produced vibrations within the material (fluid motion within the tin float chamber or conveyor system bouncing) because of the insensitivity of the measurement method to refractive index gradients and the rapidity with which the measurement is performed (typically less than 20 microseconds). The turbulent air through which the laser light is propagated appears static in this time frame.

When the invention method and apparatus is employed during manufacturing processes, air turbulence is also not a problem for another reason. The small displacement of the laser beam caused by air turbulence in the measurement region will produce a modulation of the light intensity detected at the photodetector or photodiode which is characteristically random in nature. In contrast, the intensity modulation at the photodetector or photodiode due to the displacement of the reflective surface of the material being measured by an internally reverberating acoustic wave is inherently repetitive in nature. When a Fourier transform of the photodetector or photodiode output is performed, a strong peak in the frequency spectrum corresponding to the cyclic echoing of the acoustic wave induced within the material sensed dominates over other spectral features contributed by air turbulence.

Conditions such as thermally induced turbulence and process produced vibrations seriously limit the application of interferometric and optical imaging based methods of measurement. Therefore, the invention method and apparatus provide a capability not otherwise available. The invention is truly a remote sensing system; there are no requirement that measurement components of the invention be in contact with or in the immediate proximity of the material being measured, as would be required for a conventional ultra-sound based measurement.

While the apparatuses and methods of this invention have been described in detail for the purpose of illustration, the inventive apparatuses and methods are not to be construed as limited thereby. The claims of this patent are intended to cover all changes and modifications within the spirit and scope thereof.

Industrial Applicability

The methods and apparatuses of the invention can be used for measurement of the thickness of any material which can absorb the laser light which generates an acoustical pulse within the material without significant adverse effect on the properties of the material. The invention methods and apparatuses are particularly useful for measurement of the thickness of glass, especially plate glass, during various stages of manufacture of the glass, especially in tin float bath production processes.

What is claimed is:

1. A method for measuring a material layer thickness comprising:

(a) contacting a surface of a material with a first laser pulse at a light wavelength that heats the surface of the material to generate an acoustical pulse that reverberates within the material to periodically displace the surface;

(b) directing a second laser pulse having a pulse length greater than the pulse length of the first laser pulse onto the surface of the material that is heated by the first laser pulse at an oblique angle effective to reflect from the surface;

(c) placing a detector at a location effective to detect reflections of the second laser pulse from the surface;

(d) detecting angular variations in the reflections of the second laser pulse as the surface is displaced;

(e) determining the frequency of the angular variations wherein the material thickness is inversely related to the frequency.

2. The method of claim 1 wherein the first laser pulse has a pulse width less than the time of travel of the acoustical pulse through the thickness of the material.

3. The method of claim 1 wherein the second laser pulse has a pulse width greater than the time of travel of the acoustical pulse through the thickness of the material.

4. The method of claim 1 wherein the detector is selected from the group of detectors consisting of photodetectors, photomultipliers, and photodiodes.

5. Apparatus for measuring a material layer thickness comprising:

(a) a first laser for directing a first pulse of light onto a surface of the material layer at a wavelength effective to heat the surface to generate an acoustical pulse that reverberates within the material layer to periodically displace the surface;

(b) a second laser for directing a second pulse of light onto the surface of the material at an oblique angle effective to reflect from the surface, the second pulse having a duration greater than the first pulse;

(c) a detector arranged to detect angular variations in the second pulse of light reflected from the material as the surface is displaced;

(d) means for determining the frequency of the angular variations where the material layer thickness is inversely related to the frequency.

6. The apparatus of claim 5 wherein the first pulse of light has a duration less than the time of travel of the acoustic pulse through the material layer.

7. The apparatus of claim 5 wherein the second pulse of light has a duration greater than twice the time of travel of the acoustic pulse through the material layer.

8. The apparatus of claim 5 wherein the detector is selected from the group consisting of photodetectors, photomultipliers, and photodiodes.

* * * * *

UNITED STATES PATENT AND TRADEMARK OFFICE
CERTIFICATE OF CORRECTION

PATENT NO. : 6,445,457 B1
DATED : September 24, 2002
INVENTOR(S) : Christopher Sharp It is certified that error appears in the above-identified patent and that said Letters Patent is hereby corrected as shown below:

Column 7,
Line 63, "Group 1-1111" should read -- Group 1-111 --.

Signed and Sealed this

Tenth Day of June, 2003

JAMES E. ROGAN
*Director of the United States Patent and Trademark Office*